United States Patent

[11] 3,550,896

| [72] | Inventors | Jerry A. Brown; |
| | | Clayton R. Hume, Columbus, Ind. |
| [21] | Appl. No. | 594,763 |
| [22] | Filed | Nov. 16, 1966 |
| [45] | Patented | Dec. 29, 1970 |
| [73] | Assignee | Hamilton Cosco, Inc. |
| | | Columbus, Ind. |
| | | a corporation of Indiana |

[54] MIRROR ASSEMBLY
6 Claims, 7 Drawing Figs.

[52] U.S. Cl. .................................................. 248/473,
40/152.1, 248/476
[51] Int. Cl. ...................................................... A47g 1/24
[50] Field of Search ......................................... 248/473,
468, 356, 466, 469, 476; 211/182, 86, 176;
40/145, 125H, 152.1

[56] References Cited
UNITED STATES PATENTS

| 2,919,873 | 1/1960 | Tice ............................. | 248/476 |
| 3,097,684 | 7/1963 | Le Tarte ........................ | 72/339 |
| 3,171,223 | 3/1965 | Josephson ..................... | 40/152.1X |

Primary Examiner—Marion Parsons, Jr.
Attorney—Trask, Jenkins and Hanley

ABSTRACT: A mirror assembly in which a mirror has its lateral edges received in grooves formed in the inner faces of a pair of laterally spaced tubes, said grooves having notches formed therein for reception of the corners of said mirror. A pair of brackets are received over the adjacent ends of said mirror with their ends received in said grooves and rigidly connected to said tubes. Clamps are mounted on said brackets and a pole is received in said clamps for supporting the mirror assembly in an operative position.

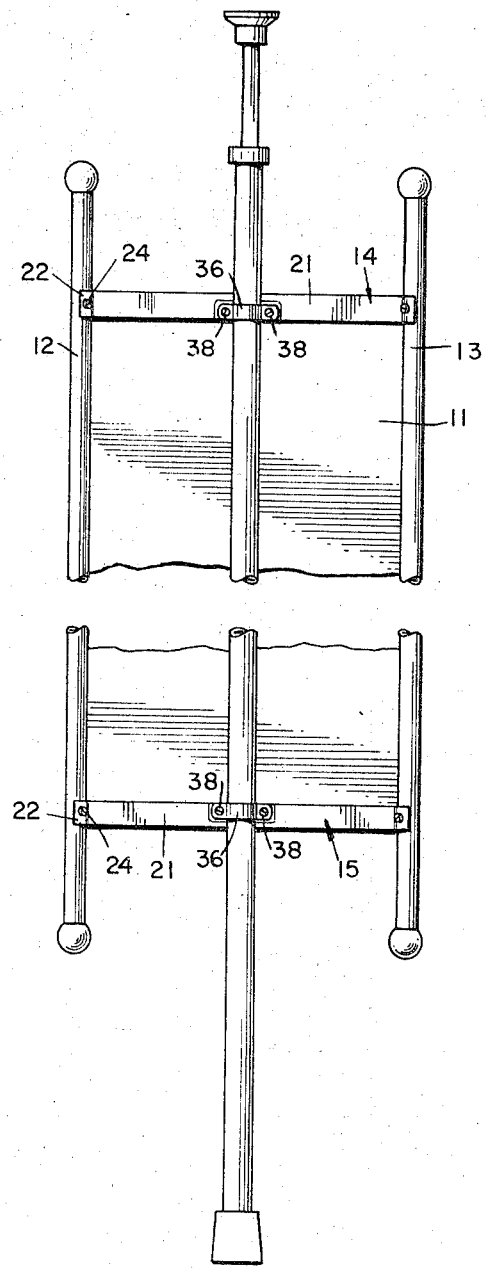
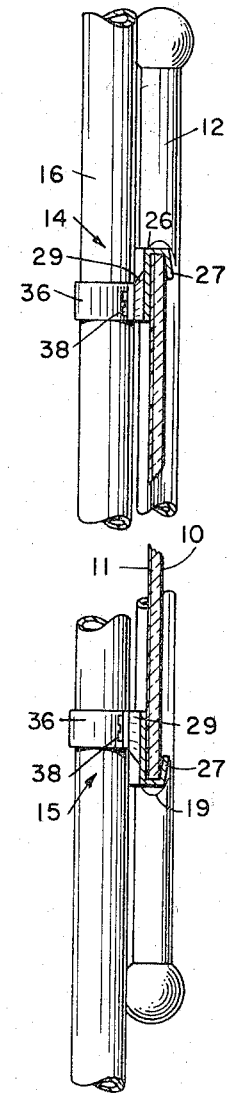
Fig. 2
Fig. 3

MIRROR ASSEMBLY

This invention relates to a mirror assembly and more particularly to a mirror assembly which can be attached to a floor to ceiling pole.

It is an object of this invention to provide a mirror assembly which can be adjustably mounted on a floor to ceiling pole, which can be economically manufactured largely from sheet metal stampings and metal-tubing, and which will have an attractive appearance yet prove sturdy and durable in use.

In accordance with one embodiment of the invention, a mirror has its opposed sides received in grooves formed in a pair of tubes. Said grooves embrace the sides of the mirror and are slightly longer than the mirror with their ends pierced to receive the mirror corners.

The ends of the mirror are received in opposed channels formed in a pair of brackets. The ends of each bracket are curved to fit against said pair of tubes and are fastened thereto. A clamp is mounted on each of the brackets for attaching the mirror assembly to a floor to ceiling pole in the desired position of adjustment thereon. Desirably, trim strips can be attached to the pair of tubes in the same manner as the brackets to project outwardly therefrom.

Other objects and features of the invention will become apparent from the more detailed description which follows and from the accompanying drawings, in which:

FIG. 2 is an enlarged fragmentary rear elevation of the mirror assembly shown in FIG. 1;

FIG. 3 is an enlarged fragmentary vertical section taken on the line 3–3 of FIG. 1;

FIG. 4 is an enlarged exploded isometric view showing a corner of the mirror assembly shown in FIG. 1;

FIG. 5 is an enlarged exploded isometric view of the lower mirror-mounting bracket;

Figure 1:
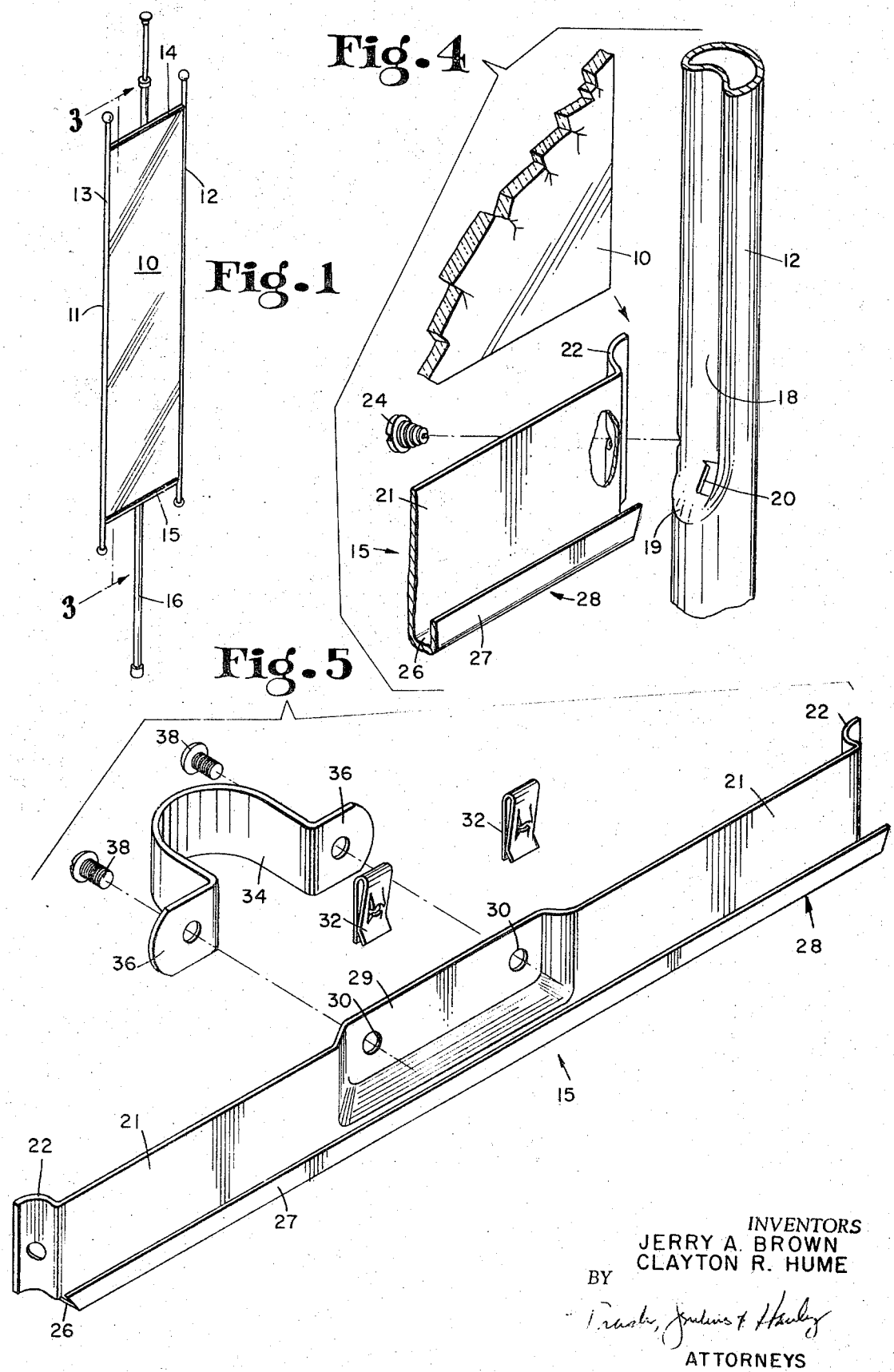
FIG. 1 is an isometric view of a mirror assembly embodying the invention.

As shown, a mirror 10 having a backing panel 11 of plastic, cardboard or the like affixed thereon is connected along its sides to a pair of tubes 12 and 13 and along its upper and lower ends to a pair of brackets 14 and 15. As will become more apparent hereinafter, the brackets 14 and 15 are connected to a floor to ceiling pole 16 for supporting the mirror in an operative position thereon.

The tubes 12 and 13 are identical in construction. Each has a length longer than the mirror 10 and has an elongated groove 18 in its inner face in which the adjacent marginal edges of the mirror body is received. The upper and lower ends of the grooves are rounded, as at 19, and notches 20 are provided for the reception of the corners of the mirror.

The tubes 12 and 13 are interconnected adjacent their upper and lower ends by the brackets 14 and 15 which are identical in construction. As shown, each of said brackets comprises a transverse strip 21 having its outer ends curved, as at 22, to abut the rear faces of the tubes and are connected thereto by screws 24. The outer edge of each strip 21 terminates in a forwardly projecting stretch 26 integral with an inwardly projecting stretch 27. Thus, strips 21 and their stretches 26 and 27 define inwardly open transverse channels 28 received over the ends of the mirror. As shown in FIGS. 4 and 5, the ends of the stretches 27 are angled outwardly to abut the curved ends 19 of the tube grooves 18 adjacent the notches 20 to further help align and interconnect the brackets and tubes.

Intermediate their ends, each strip 21 is offset rearwardly, as at 29. The offset stretch 29 is provided with a pair of openings 30 and a pair of spring clip nuts 32 are received over said stretch in alignment with the openings therein. A U-shaped clamp 34 having apertured wings 36 extends around the pole 16 and is connected to the nuts 32 and strip 21 by screws 38. Thus, with the brackets 14 and 15 being connected to tubes 12 and 13, the bracket clamps 34 mount the mirror in the desired position on the pole 16.

Figure 6:
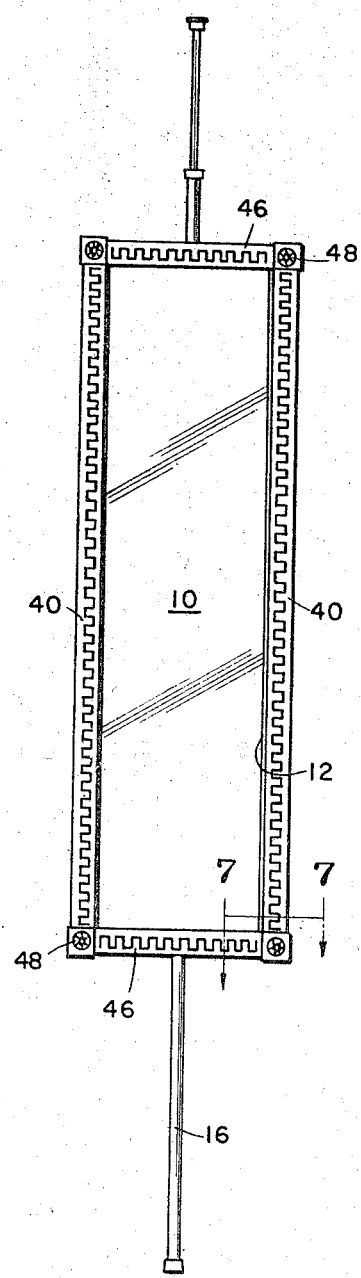
FIG. 6 is a front elevation of the mirror assembly shown in FIG. 1, but showing a trim molding mounted thereon.
Figure 7:
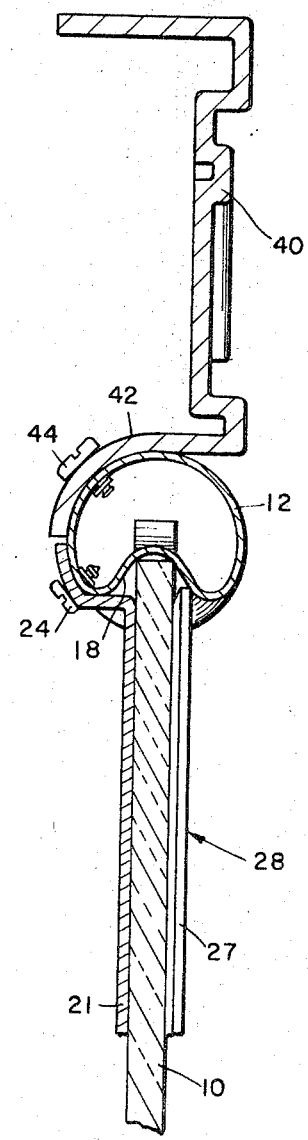
FIG. 7 is an enlarged fragmentary horizontal section taken on line 7–7 of FIG. 6.

As shown in FIGS. 6 and 7, the mirror assembly can be provided with a decorative trim molding. As shown, said molding comprises a pair of vertical side strips 40 having their inner ends curved, as at 42, to abut the rear wall of the adjacent tube 12 and 13 and connected thereto by screws 44. Upper and lower strips 46 extend across the front of brackets 14 and 15 and are connected to the side strips 40 by screws 48.

We claim:

1. A mirror assembly, comprising a mirror, a pair of laterally spaced tubes having grooves formed in their inner faces in which the adjacent edges of said mirror are received, the ends of said grooves being curved and having notches formed.

2. A mirror assembly as set forth in claim 1 in which each of said brackets has a pair of channel-forming stretches received over the adjacent edge of said mirror, the outer ends of one of said stretches being angled outwardly and abutting the curved ends of said grooves.

3. A mirror assembly as set forth in claim 2 with the addition that said channel-forming stretches are formed on a transverse strip having its outer ends wrapped partially around said tubes and rigidly connected thereto.

4. A mirror assembly as set forth in claim 1 with the addition that said tubes are connected to a pair of laterally projecting trim strips, the inner ends of said trim strips being curved to wrap partially around said tubes and rigidly connected thereto.

5. A mirror assembly as set forth in claim 4 with the addition that a second pair of trim strips extend across the front of said brackets and are connected to the trim strips connected to said tubes.

6. A mirror assembly, comprising a mirror, a pair of laterally spaced tubes having grooves formed in their inner faces in which the adjacent edges of said mirror are received, a pair of brackets each comprising a transverse strip having an inwardly open channel thereon received over the adjacent end of said mirror, the outer ends of said strips being wrapped partially around said tubes and rigidly connected thereto, said strips having rearwardly projecting offsets formed therein intermediate their ends, a generally U-shaped clamp rigidly connected to each of said offsets, and a pole interposed between said clamps and offsets for supporting said mirror in an operative position.